United States Patent
Seto et al.

[11] Patent Number: 5,882,285
[45] Date of Patent: Mar. 16, 1999

[54] PUNCHING TOOL STORING AND INTERCHANGING SYSTEM

[75] Inventors: Yoshiharu Seto; Shunzo Hirose, both of La Mirada, Calif.

[73] Assignee: Amada Mfg America, Inc., La Mirada, Calif.

[21] Appl. No.: 943,819

[22] Filed: Oct. 3, 1997

[51] Int. Cl.$^6$ .............................. B23Q 3/155; B26D 7/02
[52] U.S. Cl. ................................ 483/29; 83/563
[58] Field of Search ................... 483/1, 28, 29; 83/549, 563, 552; 72/446

[56] References Cited

U.S. PATENT DOCUMENTS

| | | |
|---|---|---|
| 3,949,635 | 4/1976 | Daniels . |
| 3,979,985 | 9/1976 | Daniels . |
| 4,004,333 | 1/1977 | Daniels . |
| 4,052,780 | 10/1977 | Daniels . |
| 4,152,978 | 5/1979 | Abe et al. . |
| 4,412,469 | 11/1983 | Hirata et al. . |
| 4,649,622 | 3/1987 | Scott ........................................ 483/29 |
| 4,656,861 | 4/1987 | Koyama et al. . |
| 4,658,625 | 4/1987 | Koyama et al. . |
| 4,680,955 | 7/1987 | Sakamoto . |
| 4,843,704 | 7/1989 | Sakamoto et al. . |
| 5,215,513 | 6/1993 | Maynard et al. . |
| 5,269,739 | 12/1993 | Maynard et al. . |
| 5,318,496 | 6/1994 | Takahashi . |
| 5,320,595 | 6/1994 | Hirata et al. . |
| 5,342,276 | 8/1994 | Fujiwara et al. . |
| 5,358,375 | 10/1994 | Kawada et al. . |
| 5,367,935 | 11/1994 | Matsuda . |
| 5,451,195 | 9/1995 | Fujiwara et al. . |
| 5,478,301 | 12/1995 | Takahashi ............................... 483/11 |

FOREIGN PATENT DOCUMENTS

| | | | |
|---|---|---|---|
| 388644 | 9/1990 | European Pat. Off. ............. | 483/29 |
| 3335330 | 10/1984 | Germany ............................. | 483/29 |
| 5185157 | 7/1993 | Japan ................................... | 483/29 |

*Primary Examiner*—William Briggs
*Attorney, Agent, or Firm*—Greenblum & Bernstein, P.L.C.

[57] ABSTRACT

A punching tool storing and interchanging system of the present invention comprises a plurality of punching tool storing magazines respectively storing the multiplicity of punching tools; a stock area stocking the plurality of punching tool storing magazines at a position apart from the punching tool holding member; an operating area positioning the punching tool storing magazine used for interchanging operation among the plurality of punching tool storing magazines near the punching tool holding member; a magazine transferring apparatus transferring the punching tool storing magazine between the stock area and the operating area; and a punching tool interchanging apparatus. The system selects the punching tool among the multiplicity of punching tools stored in the plurality of punching tool storing magazines and interchanges with the punching tool held by the punching tool holding member in the punch press.

5 Claims, 6 Drawing Sheets

PUNCHING TOOL STORING AND INTERCHANGING SYSTEM

BACKGROUND OF THE INVENTION

1. Field of the Invention

The present invention relates to a punching tool storing and interchanging system which stores a multiplicity of punching tools and interchanges a predetermined punching tool among the stored multiple punching tools with a punching tool which is held by a punching tool holding member in a punch press.

2. Description of the Related Art

A conventional punching tool storing and interchanging system will be briefly described below with containing the description concerning an operation thereof.

An operating area is provided near a turret (an embodiment of the punching tool holding member) in the punch press and a punching tool storing magazine for storing a multiplicity of punching tool is fixedly provided in the operating area. A punching tool interchanging apparatus is provided between the turret in the punch press and the punching tool storing magazine, and this punching tool interchanging apparatus is structured such as to interchange a predetermined punching tool among the multiplicity of punching tools stored in the punching tool storing magazine with the punching tool held by the turret.

In this structure, the punching tool storing magazine is fixedly provided in the operating area so that a number of the punching tool and a number of kinds of the punching tool capable of being stored in one punching tool storing magazine are limited. Particularly, in the case that a set of punching tools comprising an upper punching tool (a punch) and a lower punching tool (a die) is stored, it is necessary to prepare (storage) the same kind of punching tool sets each of which has a different clearance between the upper punching tool and the lower punching tool to each other in correspondence to a thickness of a sheet metal enough a number of the different thickness so that the number of the kinds of the punching tool sets (the punching tools) capable of being stored in one punching tool storing magazine is further reduced. Accordingly, there is a problem that it is difficult to automatically perform a various kinds of punching processes with respect to the sheet metal.

SUMMARY OF THE INVENTION

The present invention has been achieved with such points in mind.

It therefore is an object of the present invention to provide a punching tool storing and interchanging system in which a number of the punching tools and a number of the kinds of the punching tools to be interchanged are significantly increased so that a multiple kinds of punching processes can be automatically performed.

Another object of the present invention to provide a punching tool storing and interchanging system in which a control of the punching tools can be easily performed by storing the punching tools in the plurality of punching tool storing magazines.

Still another object of the present invention to provide a punching tool storing and interchanging system in which a punching tool stored in one punching tool storing magazine can be effectively used in a plurality of punch presses, thereby automatically performing a multiple kinds of punching processes in the plurality of punch presses.

To achieve the object, according to a first aspect of the present invention, there is provided a punching tool storing and interchanging system storing a multiplicity of punching tools and interchanging a predetermined punching tool among the stored multiple punching tools with a punching tool held by a punching tool holding member in a punch press, comprising: a plurality of punching tool storing magazines respectively storing the multiplicity of punching tools; a stock area stocking the plurality of punching tool storing magazines at a position apart from the punching tool holding member; an operating area positioning the punching tool storing magazine used for interchanging operation among the plurality of punching tool storing magazines near the punching tool holding member; a magazine transferring apparatus transferring the punching tool storing magazine between the stock area and the operating area; and a punching tool interchanging apparatus interchanging the predetermined punching tool among the multiplicity of punching tools stored in the punching tool storing magazine positioned at the operating area with the punching tool held by the punching tool holding member.

In accordance with the first aspect of the invention, in the case of interchanging a predetermined punching tool stored in a predetermined punching tool storing magazine (for example, a first punching tool storing magazine) with a punching tool held by the punching tool holding member in the punch press, the predetermined punching tool storing magazine is transferred from the stock area to the operating area by an operation of the magazine transferring apparatus. Then, the punching tool is interchanged by an operation of the punching tool interchanging apparatus.

In the case of interchanging the other predetermined punching tool stored in the other predetermined punching tool storing magazine (for example, a second punching tool storing magazine) with the punching tool held by the punching tool holding member, at first the predetermined punching tool storing magazine (for example, the first punching tool storing magazine) is transferred from the operating area to the stock area by the operation of the magazine transferring apparatus. Next, the other predetermined punching tool storing magazine is transferred from the stock area to the operating area by the operation of the magazine transferring apparatus. Then, the punching tool is interchanged by the operation of the punching tool interchanging apparatus.

Furthermore, in accordance with the first aspect of the invention, since any punching tool storing magazine among the plurality of punching tool storing magazines is transferred between the stock area and the operating area by the operation of the magazine transferring apparatus, a certain punching tool can be selected among the multiplicity of punching tools stored in the plurality of punching tool storing magazines so as to interchange the selected punching tool with the punching tool held by the punching tool holding member in the punch press. Accordingly, a number of the punching tool and a number of the kinds of the punching tool to be interchanged is significantly increased so that a multiple kinds of punching processes can be automatically performed.

Still further, a control of the punching tools can be easily performed by storing the punching tools in the plurality of punching tool storing magazines in such a manner as to separate the punching tools into a punching tool group (for example, a group comprising a multiplicity of punching tools having the same clearance) corresponding to a condition for a work (a material for a work, a thickness and the like).

According to a second aspect of the present invention, as it depends from the first aspect, the punching tool storing and interchanging system further comprises: a plurality of the stock areas positioned in an outer peripheral portion of the operating area; a stock area guide rail movably supporting the punching tool storing magazine in each of the stock areas to extend to a near portion of the operating area; a turn table in the operating area rotating around a vertical axis; and an operating area guide rail supporting the punching tool storing magazine in the turn table, wherein the operating area guide rail is connected to a predetermined stock area guide rail among the plurality of stock area guide rails by a rotation of the turn table.

According to the second aspect of the present invention, in addition to the operation and effect of the first aspect, in the case of transferring the predetermined punching tool storing magazine to the turn table in the operating area, the turn table is rotated around the vertical shaft so as to connect the operating area guide rail to a predetermined standing guide rail. Then, the predetermined punching tool storing magazine is transferred from the predetermined stock area to the turn table in the operating area through the stock area guide rail and the operating area guide rail by the operation of the magazine transferring apparatus.

In the case of transferring the other predetermined punching tool storing magazine from the other predetermined stock area to the turn table in the operating area, at first the turn table is rotated around the vertical shaft so as to connect the operating area guide rail to a suitable stock area guide rail in a vacant stock area and the predetermined punching tool storing magazine is transferred from the turn table to the vacant stock area through the operating area guide rail and the suitable stock area guide rail by the operation of the magazine transferring apparatus. Then, the turn table is rotated around the vertical shaft so as to connect the operating area guide rail to the other predetermined stock area guide rail and the other predetermined punching tool storing magazine is transferred from the other predetermined stock area to the turn table through the other predetermined stock area guide rail and the operating area guide rail by the operation of the magazine transferring apparatus.

According to a third aspect of the present invention, as it depends from the second aspect, the punching tool storing and interchanging system further comprises: a stock area rack member in each of the stock areas parallel to the corresponding stock area guide rail; and an operating area rack member in the turn table parallel to the operating area guide rail, wherein the operating area rack member is structured to be connected to a predetermined stock area rack member among the plurality of stock area rack members by the operation of the turn table; and the magazine transferring apparatus comprises a self-propelled motor in each of the punching tool storing magazine and a pinion being capable of meshing with the rack member to be in an interlocking manner connected to an output shaft in each of the self-propelled motor.

According to the third aspect of the present invention, in addition to the second aspect, the predetermined punching tool storing magazine can be transferred between the predetermined stock area and the turn table in the operating area by rotating the predetermined pinion by driving the predetermined self-propelled motor provided in the predetermined punching tool storing magazine under a state that the operating area guide rail is connected to the predetermined stock area guide rail.

According to a fourth aspect of the present invention, as it depends from the first aspect, the punching tool storing and interchanging system further comprises: a turn table near the punch press rotating around a vertical axis; and a plurality of magazine supporting portions supporting the punching tool storing magazines with suitable intervals in a peripheral direction on the turn table, wherein the magazine transferring apparatus is a rotating motor for rotating the turn table; and a predetermined magazine supporting portion among the plurality of magazine supporting portions is positioned to the operating area from the stock area by the rotation of the turn table.

According to the fourth aspect, in addition to the operation and effect of the first aspect, in the case of transferring the predetermined punching tool storing magazine from the stock area to the operating area, the predetermined supporting portion for supporting the predetermined punching tool storing magazine can be positioned from the stock area to the operating area by rotating the turn table around the vertical shaft by driving the rotating motor. Similarly, in the case of transferring the other predetermined punching tool storing magazine from the stock area to the operating area, the other predetermined supporting portion for supporting the other predetermined punching tool storing magazine can be positioned from the stock area to the operating area by rotating the turn table around the vertical shaft by driving the rotating motor.

According to a fifth aspect of the present invention, there is provided a punching tool storing and interchanging system storing a multiplicity of punching tools and interchanging a predetermined punching tool among the stored multiple punching tools with a punching tool held by a punching tool holding member in a first, a second, . . . and a number n (n is an integral number equal to or more than 2) punch presses, comprising: a plurality of punching tool storing magazines respectively storing a multiplicity of the punching tools; a stock area stocking the plurality of punching tool storing magazines at a position apart from the punching tool holding member in the first, the second, . . . and the number n punch press, a first, a second, . . . and a number n operating areas positioning the punching tool storing magazine used for interchanging operation among the plurality of punching tool storing magazines near each of the punching tool holding members in the first, the second, . . . and the number n punch press, a magazine transferring apparatus transferring the punching tool storing magazine between the stock area and the first, second, . . . and the number n operating areas and between the plurality of operating areas; and a first, a second, . . . and a number n punching tool interchanging apparatuses interchanging the predetermined punching tool among the multiplicity of punching tools stored in the punching tool storing magazines positioned at the first, the second, . . . and the number n operating areas with the punching tool held by the punching tool holding member in the first, the second, . . . and the number n punch presses.

According to the fifth aspect, in the case of interchanging a predetermined punching tool stored in a predetermined punching tool storing magazine with a punching tool, for example, held by the punching tool holding member in the first punch press, the predetermined punching tool storing magazine is transferred from the stock area to the first operating area by the operation of the magazine transferring apparatus. Then, the punching tool is interchanged by the operation of the first punching tool interchanging apparatus.

Further, in the case of interchanging the predetermined punching tool stored in the predetermined punching tool storing magazine with the punching tool, for example, held by the punching tool holding member in the second punch press, the predetermined punching tool storing magazine is transferred from the first operating area to the second operating area by the operation of the magazine transferring apparatus. Then, the punching tool is interchanged by the operation of the second punching tool interchanging apparatus.

In the other way, in the case of interchanging the punching tool stored in the other predetermined punching tool storing magazine with the punching tool, for example, held by the punching tool holding member in the first punch press, the predetermined punching tool storing magazine is transferred from the first operating area to the stock area or the operating area other than the first operating area by the operation of the magazine transferring apparatus. Next, the other predetermined punching tool storing magazine is transferred from the stock area to the first operating area by the operation of the magazine transferring apparatus. Then, the punching tool is interchanged by the operation of the first punching tool interchanging apparatus.

Furthermore, in accordance with the fifth aspect, since any punching tool storing magazine among the plurality of punching tool storing magazines is transferred between the stock area and the first, second, . . . , the number n operating areas by the operation of the magazine transferring apparatus, the same effect as that of the invention as recited in the first aspect. Still further, since the plurality of punching tool storing magazines can be transferred between the plurality of the operating areas by the operation of the magazine transferring apparatus, any punching tool stored in one punching tool storing magazine can be interchanged with the punching tool, for example, held by the punching tool holding member in the first punch press, or with the punching tool, for example, held by the punching tool holding member in the second punch press so that the punching tool stored in one punching tool storing magazine can be effectively used, thereby automatically performing a multiple kinds of punching processes in the plurality of punch presses.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
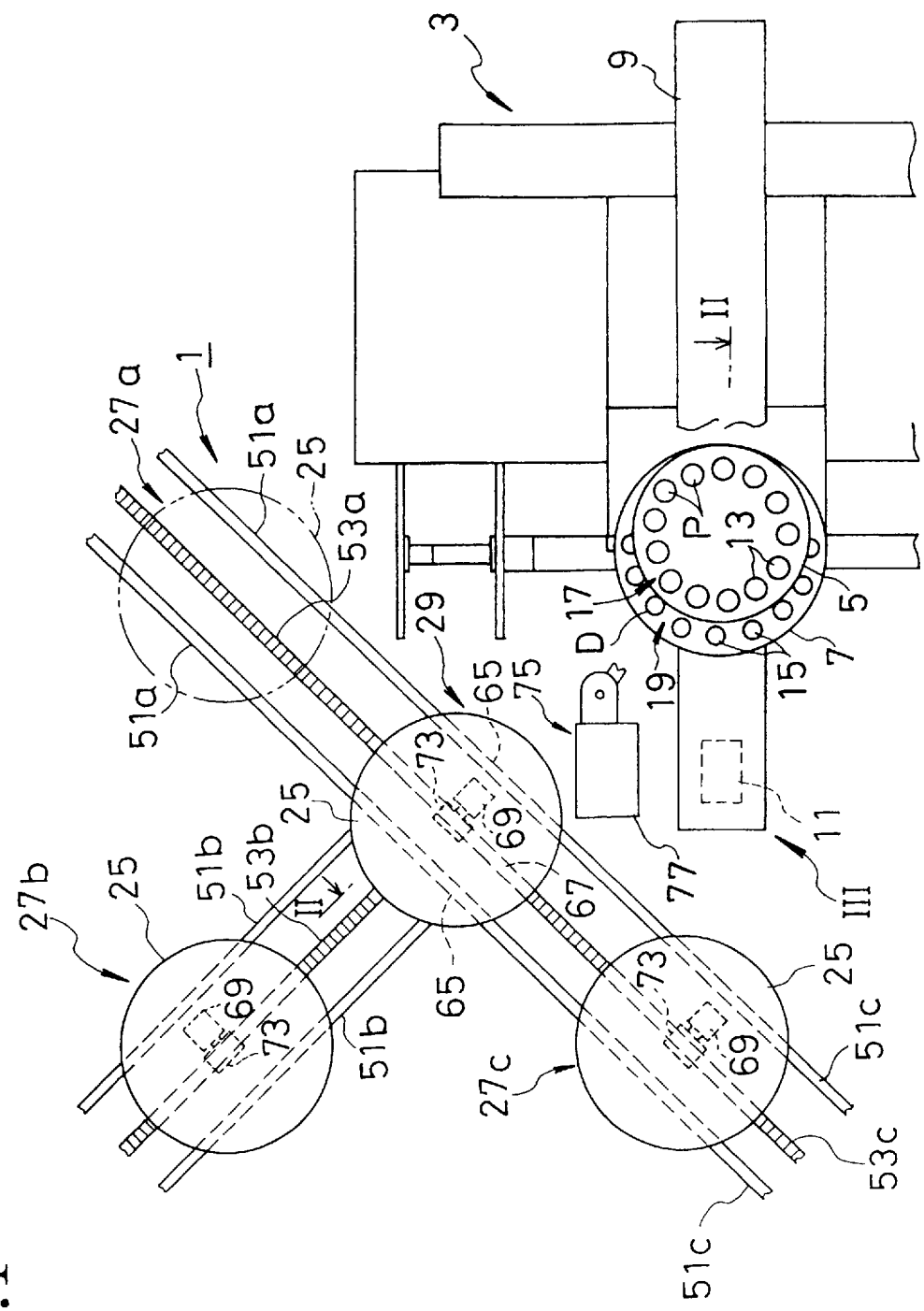
FIG. 1 is a plan view which shows a punching tool storing and interchanging system in accordance with a first embodiment of the present invention.

There will be detailed below the preferred embodiments of the present invention with reference to the accompanying drawings. Like members are designated by like reference characters.

Figure 2:
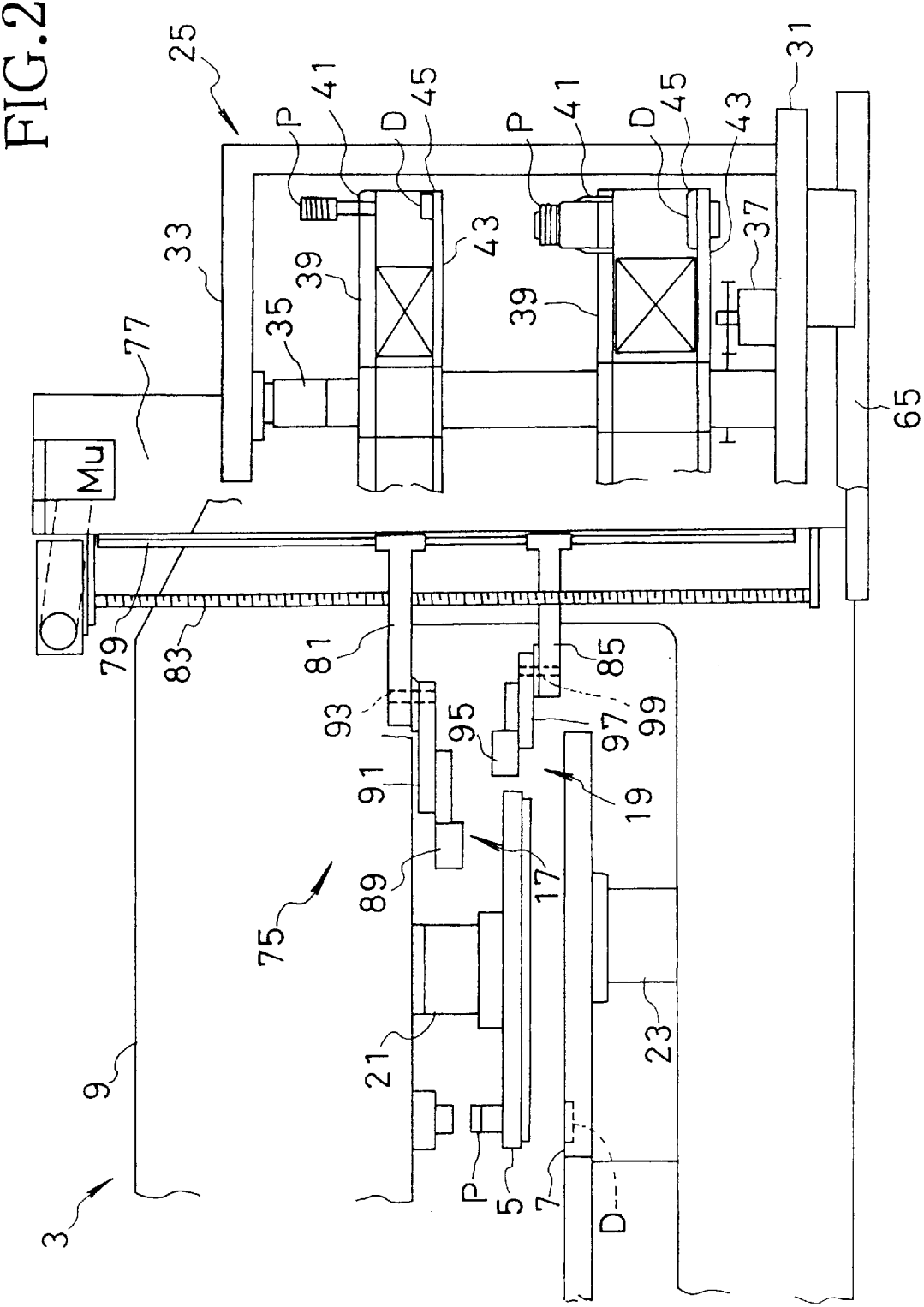
FIG. 2 is a side view taken along a line II—II in FIG. 1.
Figure 3:
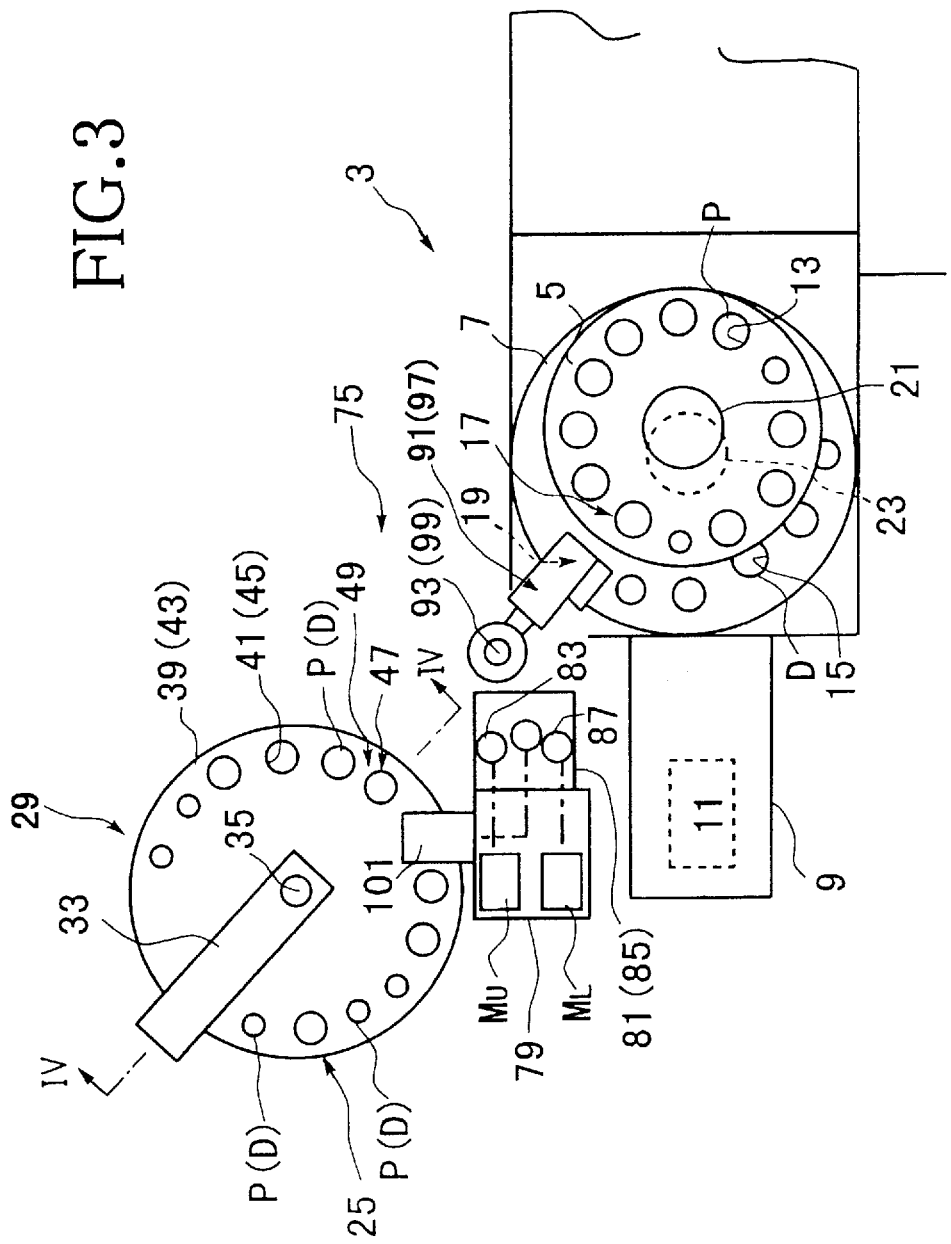
FIG. 3 is a partially enlarged plan view of FIG. 1 which also shows a portion indicated by an arrow III in FIG. 1.

With reference to FIGS. 1 to 3, a punching tool storing and interchanging system 1 in accordance with an embodiment of the present invention is provided near a turret punch press 3. The punching tool interchanging system 1 is structured such as to storage a multiplicity of punching tools which are constructed by a plural punches P and a plural dies D. The punching tool storing and interchanging system 1 interchanges one predetermined punching tool which is set of the punch P and the die D among the stored multiple punching tools P and D with another punching tool which is set of another punch P and another die D held by an upper and lower turrets 5 and 7 in the turret punch press 3. Before explaining the detail of the above punching tool interchanging system 1, the turret punch press 3 in accordance with the embodiment of the present invention will be briefly explained below.

The above turret punch press 3 has a bridge like main frame 9 as a base structure, the above disc like upper turret 5 and the above disc like lower turret 7 are provided in the main frame 9 in such a manner as to opposing to each other in a vertical direction (an inside and outside direction with respect to a paper surface in FIGS. 1 and 3 and an up and down direction in FIG. 2) and the upper turret 5 and the lower turret 7 are rotated by an operation of a turret servo motor 11 in a synchronous manner. The upper turret 5 is provided with a plurality of punch holding portions 13 for detachably holding the punch (the upper punching tool) P at a suitable position along a peripheral direction, and the lower turret 7 is provided with a plurality of die holding portions 15 for detachably holding the die (the lower punching tool) D at a suitable position along a peripheral direction. The punch holding portion 13 and the die holding portion 15 are structured such that a predetermined punch holding portion 13 and a predetermined die holding portion 15 are respectively positioned in a punch interchanging area (an area at which the punch P is interchanged in the turret punch press 3 side) 17 and a die interchanging area (an area at which the die D is interchanged in the turret punch press 3 side) 19 by a synchronous rotation of the upper turret 5 and the lower turret 7. Further, in order to prevent the upper turret 5 from being positioned above the die interchanging area 19, the upper turret 5 is structured to be smaller than the lower turret 7 and an upper rotation shaft 21 of the upper turret 5 and a lower rotation shaft 23 of the lower turret 7 are eccentrically disposed.

Next, the punching tool interchanging system 1 in accordance with a first embodiment of the present invention will be described in detail.

A plurality of punching tool storing magazines 25 for respectively storing a multiplicity of punching tools P and D is provided near the turret punch press 3, stock areas 27a, 27b and 27c for stocking the plurality of punching tool storing magazines 25 are provided at a position apart from the turrets 5 and 7, and an operating area 29 at which the punching tool storing magazine 25 used for an interchanging operation can be positioned among the plurality of punching tool storing magazines 25 is provided near the turrets 5 and 7. In this structure, the plurality of stock areas 27a, 27b and 27c can be positioned at an outer peripheral portion of the operating area 29.

Each of the punching tool storing magazine 25 has a magazine base 31 as a base structure, and a supporting column 33 is extended from the magazine base 31. The supporting column 33 is provided with a rotating member 35 extending to a vertical direction in such a manner as to rotate, and the rotating member 35 is connected to a magazine servo motor 37 in an interlocking manner. The above rotating member 35 is provided with a disc like punch storing frame 39, and the punch storing frame 39 is provided with a multiplicity of punch storing portions 41 for detachably storing the punches P at a suitable position along a peripheral direction. Further, the rotating member 35 is provided with a disc like die storing frame 43 in such a manner as to oppose to the punch storing frame 39 in a vertical direction, and the die storing frame 43 is provided with a multiplicity of die storing portions 45 for detachably storing the dies D at a suitable position along a peripheral direction. After one punching tool storing magazine 25 of the plurality of punching tool storing magazines 25 is positioned at the operating area 29, the rotating member 35 is rotated so as to integrally rotate the punch storing frame 39 and the die storing frame 43, thereby positioning a predetermined punch storing portion 41 among the multiplicity of punch storing portions 41 to a punch picking out area (an area at which the punch P is picked out in the turret punch press 3 side) 47 and as in the same manner positioning a predetermined die storing portion 45 among the multiplicity of die storing portions 45 to a die picking out area (an area at which the die D is picked out in the turret punch press 3 side) 49. In this case, a pair of storing frames 39 and 43 opposing to each other in the vertical direction are structured such that they can be attached and detached to the rotating member 35 and that a position in a height direction can be adjusted, and further, a plural pairs of storing frames 39 and 43 can be attached and detached to the rotating member 35.

Figure 4:
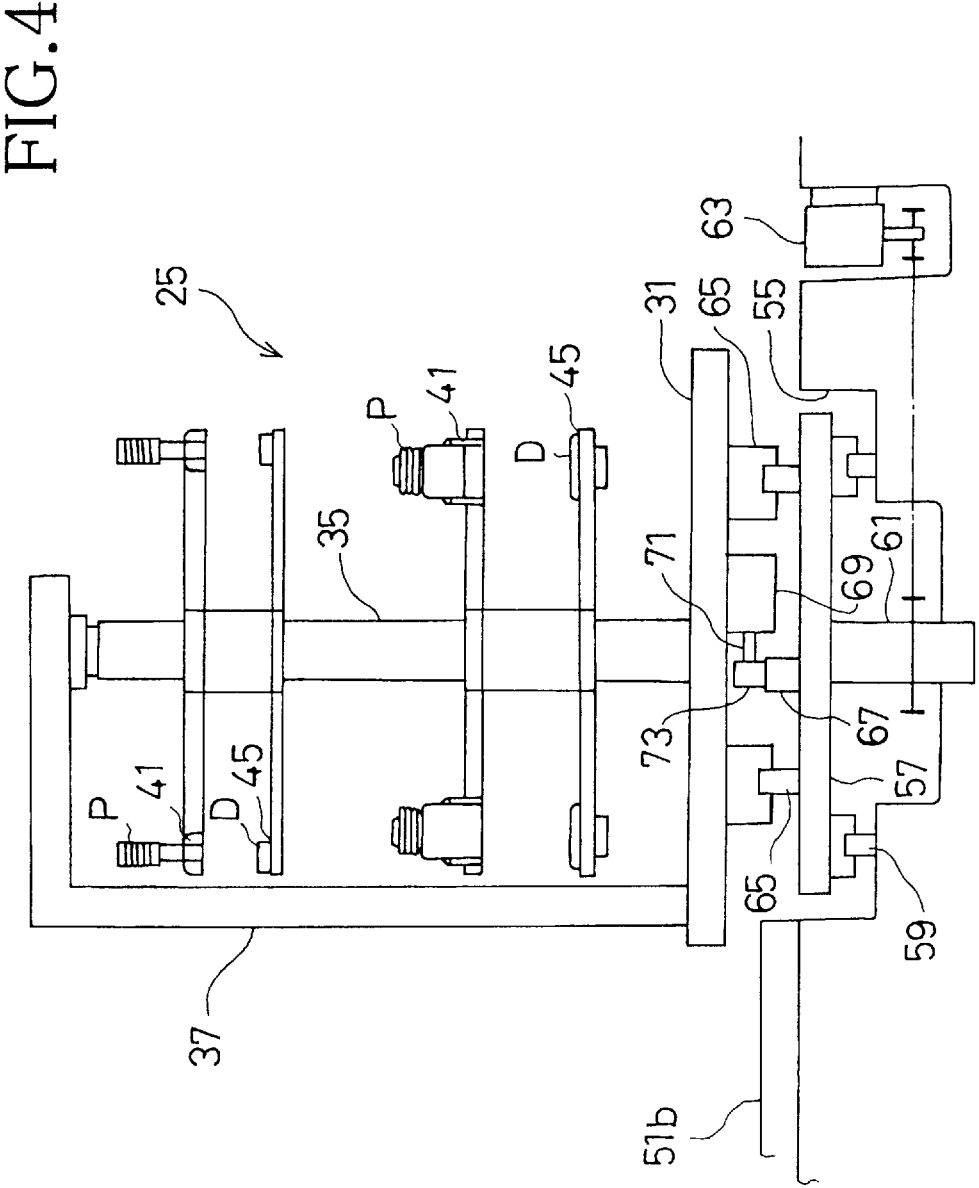
FIG. 4 is a side view taken along a line IV—IV in FIG. 3.

With reference to FIGS. 1 and 4, the stock areas 27a, 27b and 27c are respectively provided with stock area guide rails 51a, 51b and 51c for movably supporting the punching tool storing magazine 25 in such a manner as to extend to the operating area 29, and the stock areas 27a, 27b and 27c are respectively provided with stock area rack members 53a, 53b and 53c in such a manner as to be parallel to the corresponding stock area guide rails 51a, 51b and 51c. The above operating area 29 is provided with a recess portion 55 like a pit, the recess portion 55 is provided with a turn table 57 in such a manner as to rotate around a vertical shaft 61 through a circular arc guide 59, and the vertical shaft 61 is connected to a rotating motor 63 in an interlocking manner. The turn table 57 is provided with an operating area guide rail 65 for supporting the punching tool storing magazine 25, and further, the turn table 57 is provided with an operating area rack member 67 in such a manner as to be parallel to the operating area guide rail 65. Then, the structure is made such that by rotating the turn table 57 around the vertical shaft 61, the operating area guide rail 65 is connected to any one stock area guide rail of the plurality of stock area guide rails 51a, 51b and 51c and the operating area rack member 67 is connected to any one stock area rack member of the plurality of stock area rack members 53a, 53b and 53c. In order to transfer the punching tool storing magazine 25 in a state of being disposed between any one of the stock areas 27a, 27b and 27c and the operating area 29, a self-propelled motor 69 is provided on the magazine base 31 in each of the punching tool storing magazines 25, and a pinion 73 which can engage with the rack members 53a, 53b, 53c and 67 is connected to an output shaft 71 in the self-propelled motor 69 in an interlocking manner.

A punching tool interchanging apparatus 75 for interchanging the punch P and the die D is provided between the turret punch press 3 and the operating area 29.

Accordingly, with reference to FIGS. 1 to 3, a supporting frame 77 is provided in a standing manner between the turret punch press 3 and the operating area 29, and the supporting frame 77 is provided with an ascending and descending guide 79 extending to the vertical direction. The above ascending and descending guide 79 is provided with an upper ascending and descending member 81 in such a manner as to ascend and descend by an operation of an upper ascending and descending member servo motor $M_U$ and an upper ascending and descending member ball screw 83, and the ascending and descending guide 79 is provided with a lower ascending and descending member 85 in such a manner as to ascend and descend by an operation of a lower ascending and descending member servo motor $M_L$ and a lower ascending and descending member ball screw 87. The upper ascending and descending member 81 is provided with a punch interchanging arm 91 having a hand portion 89 for detachably holding the punch P at a front end thereof in such a manner as to swing to a horizontal direction through a swing shaft 93, and the lower ascending and descending member 85 is provided with a die interchanging arm 97 having a hand portion 95 for detachably holding the die D at a front end thereof in such a manner as to swing to a horizontal direction through a swing shaft 99. In this case, the punch interchanging arm 91 and the die interchanging arm 97 are structured such as to synchronously swing in a horizontal direction by an operation of a swing motor 101, the hand portion 89 can be positioned to the punch interchanging area 17 or the punch picking out area 47 by a horizontal swinging motion of the punch interchanging arm 91, and the hand portion 95 can be positioned to the die interchanging area 19 or the die picking out area 49 by a horizontal swinging motion of the die interchanging arm 97. In this case, the hand portion 89 may be structured such as to move to a longitudinal direction of the punch interchanging arm 91 and the hand portion 95 may be structured such as to move to a longitudinal direction of the die interchanging arm 97.

The description will be given to the case of interchanging a predetermined punch P and die D among the multiplicity of punches P and dies D stored in the punching tool storing magazine 25 with a punch P and a die D held by the turret 5 and 7 by using the punching tool interchanging apparatus 75 hereinafter.

The predetermined punch holding portion 13 among the multiplicity of punch holding portions 13 and the predetermined die holding portion 15 among the multiplicity of die holding portions 15 are respectively positioned to the punch interchanging area 17 and the die interchanging area 19 by synchronously rotating the upper turret 5 and the lower turret 7 by the operation of the turret servo motor 11. Further, the hand portion 89 in the punch interchanging arm 91 and the hand portion 95 in the die interchanging arm 97 are positioned to the punch interchanging area 17 and the die interchanging area 19 by synchronously swinging the punch interchanging arm 91 and the die interchanging arm 97 by the operation of the swinging motor 101. Next, the punch interchanging arm 91 is descended by the operation of the upper descending and ascending member motor $M_U$ so that the hand portion 89 clamps the punch P held by the predetermined punch holding portion 13, and the die interchanging arm 97 is descended by the operation of the lower ascending and descending member motor $M_L$ so that the hand portion 95 clamps the die D held by the predetermined die holding portion 15. Further, the punch interchanging arm 91 is ascended by the operation of the upper descending and ascending member motor $M_U$ so that the punch P is picked out from the predetermined punch holding portion 13, and the die interchanging arm 97 is ascended by the operation of the lower ascending and descending member motor $M_L$ so that die D is picked out from the predetermined die holding portion 15.

After removing the punch P and the die D, the punch interchanging arm 91 and the die interchanging arm 97 are swung in the horizontal direction by the operation of the swinging motor 101 so that the hand portion 89 in the punch interchanging arm 91 and the hand portion 95 in the die interchanging arm 97 are respectively positioned to the punch picking out area 47 and the die picking out area 49. Further, by rotating the rotating member 35 by the operation of the magazine servo motor 37, the vacant punch storing portion 41 and the vacant die storing portion 45 are respectively positioned to the punch picking out area 47 and the die picking out area 49. Next, the clamping state of the hand portion 89 is removed by descending the punch interchanging arm 91 by the operation of the upper ascending and descending member motor $M_U$ so that the above punch P is stored in the vacant punch storing portion 41, and the clamping state of the hand portion 95 is removed by descending the die interchanging arm 97 by the operation of the lower ascending and descending member motor $M_L$ so that the above die D is stored in the vacant die storing portion 45. Then, the punch interchanging arm 91 and the die interchanging arm 97 are temporally ascended respectively so as to swing in the horizontal direction, thereby respectively moving the hand portion 89 in the punch interchanging arm 91 and the hand portion 95 in the die interchanging arm 97 apart from the punch picking out area 47 and the die picking out area 49.

After respectively moving the hand portion 89 in the punch interchanging arm 91 and the hand portion 95 in the die interchanging arm 97 apart from the punch picking out area 47 and the die picking out area 49, the rotating member 35 is rotated by the operation of the magazine servo motor 37 so that the predetermined punch storing portion 41 among the multiplicity of punch storing portion 41 and the predetermined die storing portion 45 among the multiplicity of die storing portion 45 are respectively positioned to the punch picking out area 47 and the die picking out area 49. Next, by swinging the punch interchanging arm 91 and the die interchanging arm 97 in the horizontal direction, the hand portion 89 in the punch interchanging arm 91 and the hand portion 95 in the die interchanging arm 97 are respectively positioned to the punch picking out area 47 and the die picking out area 49. Then, by descending the punch interchanging arm 91, the hand portion 89 clamps the predetermined punch P stored in the predetermined punch storing portion 41, and by descending the die interchanging arm 97, the hand portion 95 clamps the predetermined die D stored in the predetermined die storing portion 45. Further, by ascending the punch interchanging arm 91, the predetermined punch P is picked out from the predetermined punch storing portion 41, and by ascending the die interchanging arm 97, the predetermined die D is picked out from the predetermined die storing portion 45.

After picking out the predetermined punch P and the predetermined die D, by swinging the punch interchanging arm 91 and the die interchanging arm 97 in the horizontal direction, the hand portion 89 in the punch interchanging arm 91 and the hand portion 95 in the die interchanging arm 97 are respectively positioned to the punch interchanging area 17 and the die interchanging area 19. Further, the clamping state of the hand portion 89 is removed by descending the punch interchanging arm 91 so that the predetermined punch P is held by the predetermined punch holding portion 13, and the clamping state of the hand portion 95 is removed by descending the die interchanging arm 97 so that the predetermined die D is held by the predetermined die holding portion 15. In this case, after holding the predetermined punch P and the predetermined die D, by ascending the punch interchanging arm 91 and the die interchanging arm 97, the punch interchanging arm 91 and the die interchanging arm 97 are swung in the horizontal direction.

Next, an operation of the first embodiment will be described below.

In the case of interchanging the predetermined punch P and the die D stored in the punching tool storing magazine 25 which waits at the predetermined stock area (for example, 27a) with the punch P and the die D held by the holding portions 13 and 15 in the turrets 5 and 7, the turn table 57 is rotated around the vertical shaft 61 by the operation of the rotating motor 63 so as to connect the operating area guide rail 65 to the predetermined stock area guide rail 51a and to connect the operating area rack member 67 to the predetermined stock area rack member 53a. Further, the predetermined pinion 73 is rotated by the operation of the predetermined self-propelled motor 69 provided in the predetermined punching tool storing magazine 25, whereby the predetermined punching tool storing magazine 25 can be transferred from the predetermined stock area 27a to the operating area 29 through the stock area guide rail 51a and the operating area guide rail 65. Then, as mentioned above, the punch P and the die D can be interchanged by the punching tool interchanging apparatus 75.

Next, in the case of interchanging the predetermined punch P and the die D stored in the punching tool storing magazine 25 which waits at the other stock area (for example, 27b) with the punch P and the die D held by the holding portions 13 and 15 in the turrets 5 and 7, the turn table 57 is rotated around the vertical shaft 61 by the operation of the rotating motor 63 so as to connect the operating area guide rail 65 to the suitable stock area guide rail (for example, 51a) and to connect the operating area rack member 67 to the suitable stock area rack member (for example, 53a). (In the meantime, in the case that the above connecting state is maintained, it is not necessary to rotate the turn table 57.) Next, the punching tool storing magazine 25 positioned at the operating area 29 is transferred from the turn table 57 to the suitable stock area 27a through the operating area guide rail 65 and the stock area guide rail 51a by the operation of the self-propelled motor 69. Further, the turn table 57 is rotated around the vertical shaft 61 by the operation of the rotating motor 63 so as to connect the operating area guide rail 65 to the other predetermined stock area guide rail 51b and to connect the operating area rack member 67 to the other stock area rack member 53b. Still further, the punching tool storing magazine 25 positioned at the stock area 27b is transferred from the other predetermined stock area 27b to the turn table 57 through the other predetermined stock area guide rail 51b and the operating area guide rail 65 by the operation of the self-propelled motor 49. Then, the punch P and the die D can be interchanged by the punching tool interchanging apparatus 75.

As mentioned above, in accordance with the first embodiment of the present invention, since any one punching tool storing magazine 25 of the plurality of punching tool storing magazines 25 can be transferred between the suitable stock area and the operating area 29, the predetermined punch P and the die D can be selected among the multiplicity of punches P and the dies D stored in the plurality of punching tool storing magazines 25 and the selected punch P and the die D can be interchanged with the punch P and the die D held by the holding portions 13 and 15 in the turrets 5 and 7. Accordingly, the number of the punch P and the die D to be interchanged and the number of the kind of the punch P and the die D to be interchanged are significantly increased so that a multiple kinds of punching processes can be automatically performed.

Further, by storing the punching tools in plurality of punching tool storing magazines 25 in a state of separating the punching tools into the punching tool groups (for example, the multiplicity of punches P and dies D having the same clearance) corresponding to the work condition (the material of the work, the thickness thereof and the like), the punch P and the die D can be easily controlled.

Figure 5:
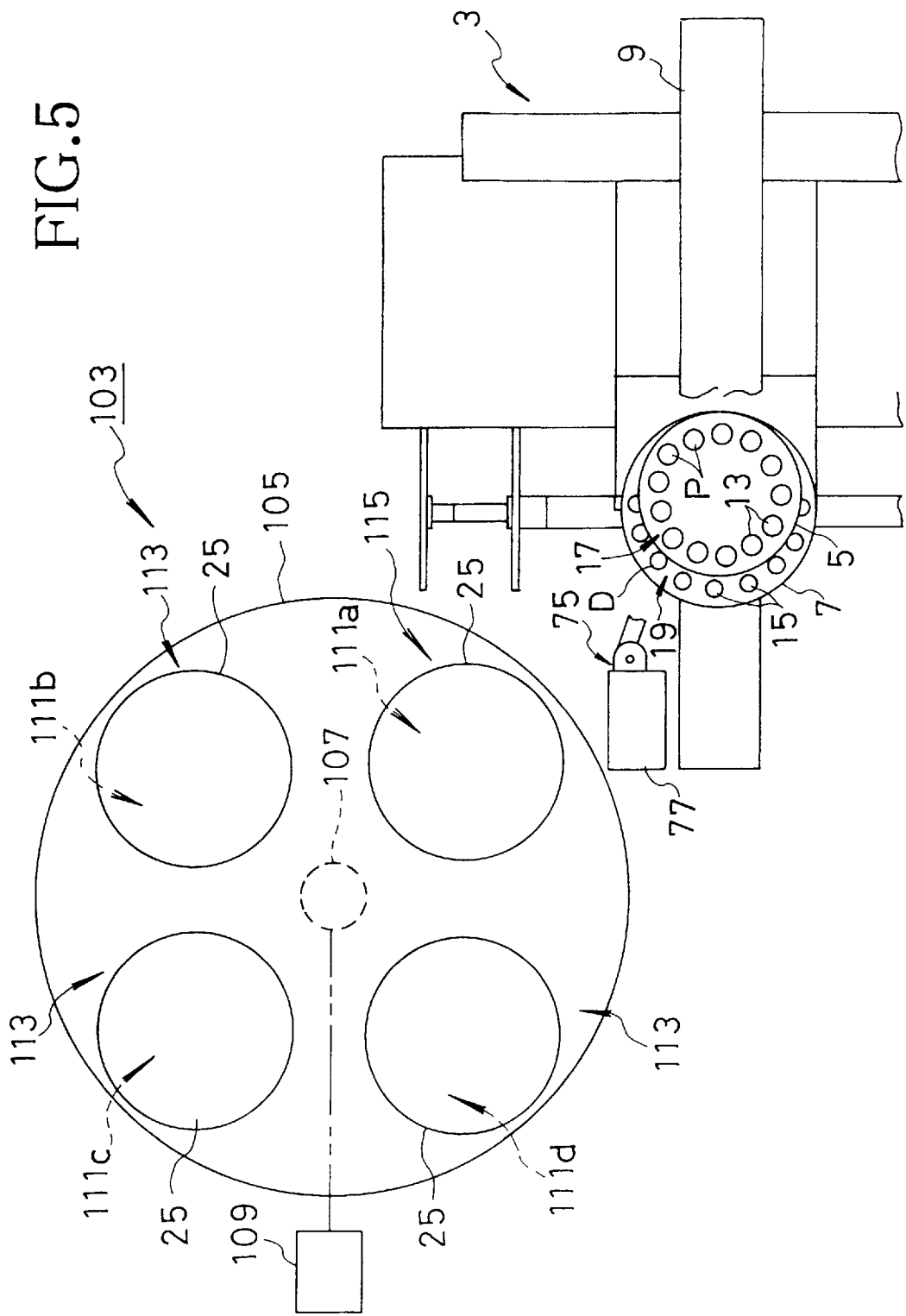
FIG. 5 is a plan view which shows a punching tool storing and interchanging system in accordance with a second embodiment of the present invention.

Next, a punching tool storing and interchanging system 103 in accordance with a second embodiment of the present invention will be explained below with reference to FIG. 5. In this case, among a multiplicity of elements of the punching tool storing and interchanging system 103, the same reference numerals are attached to the same elements as the elements of the punching tool storing and interchanging system 1 in accordance with the first embodiment of the present invention, and the explanation thereof will be omitted.

A turn table 105 is provided near the turret punch press 3 in such a manner as to rotate around a vertical shaft 107, and a rotating motor 109 is connected to the vertical shaft 107 in an interlocking manner. The above turn table 105 is provided with a magazine supporting portion 111 for supporting the punching tool storing magazine 25 at a suitable position along a peripheral direction, which is structured such as to position a predetermined magazine supporting portion among a plurality of magazine supporting portions 111a, 111b, 111c and 111d from a stock area 113 to an operating area 115 or position from the operating area 115 to the stock area 113 by a rotation of the turn table 105. In this case, the stock area 113 is provided at a position apart from the turrets 5 and 7 and is structured such as to stock a plurality of punching tool storing magazines 25, and the operating area 115 is provided near the turrets 5 and 7, in which the punching tool magazine 25 used for interchanging operation can be positioned.

On the basis of the above structure of the invention, an operation of the second embodiment of the present invention will be described below.

In the case of interchanging the predetermined punch P and the die D stored in the rotating magazine 25 supported on the predetermined magazine supporting portion (for example, 111a) among the plurality of magazine supporting portions 111a, 111b, 111c and 111d with the punch P and the die D held by the holding portions 13 and 15 in the turrets 5 and 7, the turn table 105 is rotated around the vertical shaft 107 by the operation of the rotating motor 109 so as to position the predetermined magazine supporting portion 111a from the stock area 113 to the operating area 115. Then, the punch P and the die D can be interchanged by the mold metal interchanging apparatus 75.

Further, in the case of interchanging the other predetermined punch P and the die D stored in the punching tool storing magazine 25 supported by the other predetermined magazine supporting portion (for example, 111b) with the punch P and the die D held by the holding portions 13 and 15 in the turrets 5 and 7, the turn table 105 is rotated around the vertical shaft 107 by the operation of the rotating motor 109 so as to position the other predetermined magazine supporting portion 111b from the stock area 113 to the operating area 115. Then, the punch P and the die D can be interchanged by the punching tool interchanging apparatus 75.

As mentioned above, the second embodiment can obtain the same effect as that of the first embodiment.

Figure 6:
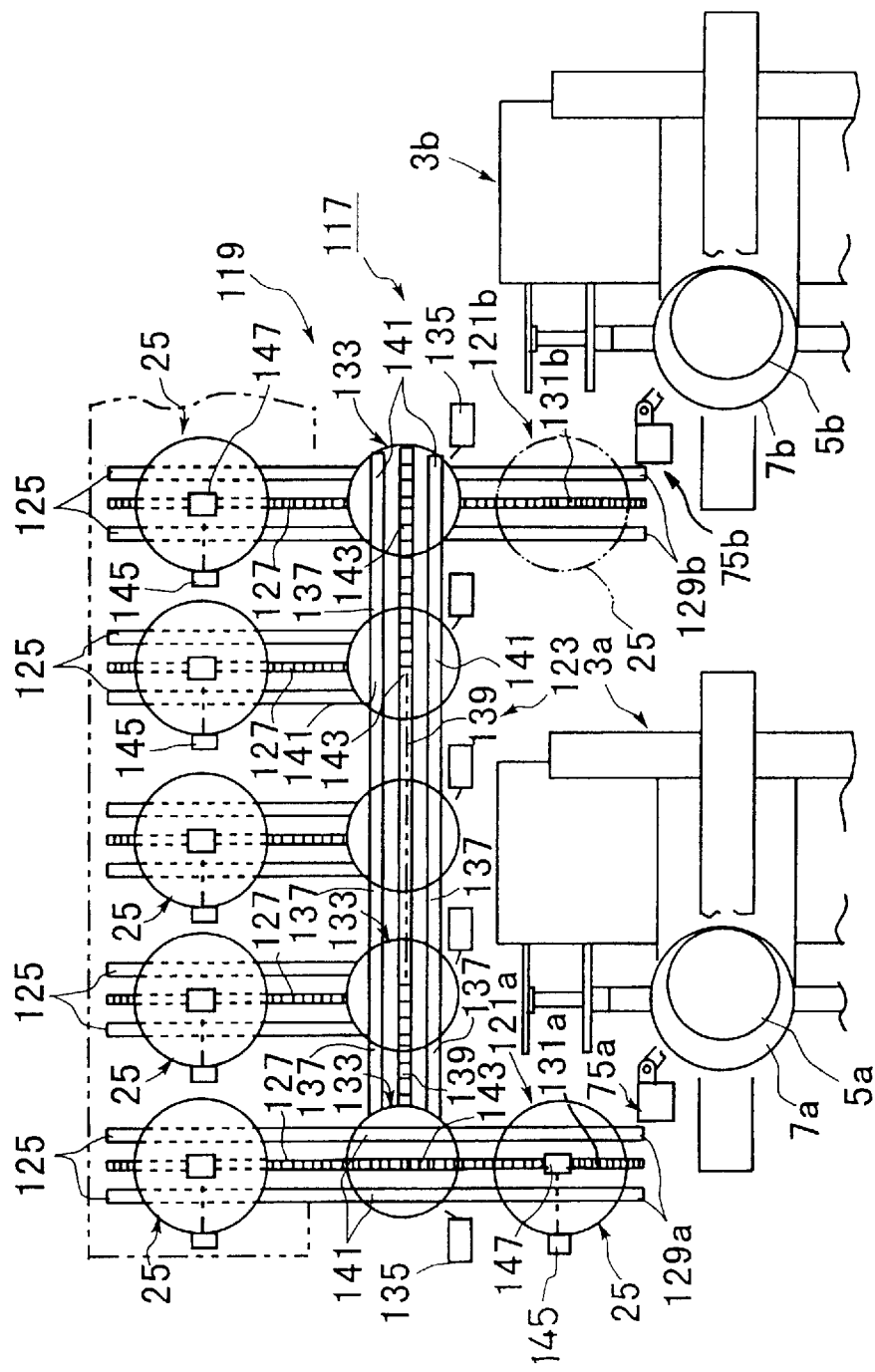
FIG. 6 is a plan view which shows a punching tool storing and interchanging system in accordance with a third embodiment of the present invention.

Finally, a third embodiment of the present invention will be explained below with reference to FIG. 6.

A punching tool storing and interchanging system 117 in accordance with the third embodiment of the present invention stores a multiplicity of punches P and dies D, and interchanges a predetermined punch P and die D among the stored multiplicity of punches P and the dies D with the punch P and the die D held by the turrets 5a, 5b, 7a and 7b in the first and second punch presses 3a and 3b. In the meantime, among the multiplicity of elements of the punching tool storing and interchanging system 117 in accordance with the third embodiment of the present invention, the same reference numerals (including the reference numerals obtained by adding symbols a or b to the same reference numerals) will be attached to the same elements as the elements of the punching tool storing and interchanging apparatus 1 in accordance with the first embodiment of the present invention, and the description thereof will be omitted.

A stock area 119 for stocking the plurality of punching tool storing magazine 25 is provided at a position apart from the turrets 5a, 7a, 5b and 7b in the first and second turret punch presses 3a and 3b, and first and second operating areas 121a and 121b in which the metal magazine 25 used for interchanging operation among the plurality of punching tool storing magazines 25 can be positioned are provided near each of the turrets 5a, 7a, 5b and 7b in the first and second turret punch presses 3a and 3b. Further, a middle area 123 extending laterally is provided between the stock area 119 and the operating areas 121a and 121b. The above stock area 119 is provided with a plural sets of stock area guide rails 125 for supporting the punching tool storing magazine 25 so as to move in the longitudinal direction, in such a manner as to extend near the middle area 123, and the stock area 119 is provided with a plurality of stock area rack members 127 in such a manner as to be parallel and close to the corresponding stock area guide rails 125. The above operating areas 121a and 121b are provided with operating area guide rails 129a and 129b for supporting the punching tool storing magazine 25 so as to move longitudinally, and the operating areas 121a and 121b are provided with operating area rack members 131a and 131b in such a manner as to be parallel and close to the corresponding operating area guide rails 129a and 129b.

The above middle area 123 is provided with a plurality of turn tables 133 at a suitable interval along the lateral direction, and each of the turn tables 133 can be rotated by the operation of a rotating motor 135. A middle guide 137 for supporting the punching tool storing magazine 25 so as to move laterally is provided between the adjacent turn tables 133, and a middle rack member 139 is provided between the adjacent turn tables 133 in such a manner as to be parallel and close to the corresponding middle guide 137. Each of the turn table 133 is provided with a rotating guide 141 for movably supporting the punching tool storing magazine 25, and each of the turn table 133 is provided with a rotating rack member 143 in such a manner as to be parallel and close to the corresponding rotating guide 141. In this case, rotation of the turn table 133 can switch the state between the state in which the rotating guide 141 is connected to the corresponding stock area guide rail 125 and the rotating rack member 143 is connected to the corresponding stock area rack member 127, and the state in which the rotating guide 141 is connected to the corresponding middle guide 137 and the rotating rack member 143 is connected to the corresponding middle rack member 139. In the case of rotating the rightmost turn table 133 and the leftmost turn table 133, when the rotating guide 141 is connected to the corresponding stock area guide rail 125 and the rotating rack member 143 is connected to the corresponding stock area rack member 127, the rotating guide 141 is connected to the corresponding operating area guide rail 129a or 129b and the rotating rack member 143 is connected to the corresponding operating area rack member 131a or 131b. In order to transfer each of the punching tool storing magazines 25 between the stock area 119 and the operating areas 121a and 121b, and between the plurality of operating areas 121a and 121b, each of the punching tool storing magazines 25 is provided with a self-propelled motor 145, and a pinion 147 which can mesh with the rack members 127, 131a, 131b, 139 and 143 is connected to the self-propelled motor 145 in an interlocking manner.

On the basis of the above structure of the invention, an operation of the third embodiment will be described below.

In the case of interchanging the predetermined punch P and the die D stored in the leftmost punching tool storing magazine 25 with the punch P and the die D held by the holding portions 13a and 15a of the turrets 5a and 7a in the first turret punch press 3a, the leftmost turn table 133 is rotated so as to switch the state to the state in which the rotating guide 141 is connected to the corresponding stock area guide rail 125 and operating area guide rail 129a, and the rotating rack member 143 is connected to the corresponding stock area rack member 127 and operating area rack member 131a. Then, the leftmost punching tool storing magazine 25 is transferred from the stock area 119 to the first operating area 121a through the middle area 123 by the operation of the self-propelled motor 145. Then, the punch P and the die D can be interchanged by the first punching tool interchanging apparatus 75a.

In the case of interchanging the other predetermined punch P and the die D stored in the punching tool storing magazine 25 with the punch P and the die D held by the holding portions 13b and 15b of the turrets 5b and 7b in the turret punch press 3b by transferring the punching tool storing magazine 25 from the first operating area 121a to the second operating area 121b, the above punching tool storing magazine 25 is transferred from the first operating area 121a to the leftmost turn table 133 in the middle area 123 by the operation of the self-propelled motor 145. Next, rotation of the leftmost turn table 133 switches the state to the state in which the rotating table 141 is connected to the corresponding middle guide 137 and the rotating rack member 143 is connected to the corresponding middle rack member 139. Then, the above punching tool storing magazine 25 is transferred from the leftmost turn table 133 onto the rightmost turn table 133 by the operation of the self-propelled motor 145.

Further, rotation of the rightmost turn table 133 switches the state to the state in which the rotating guide 141 is connected to the corresponding stock area guide rail 125 and operating area guide rail 129b and the rotating rack member 143 is connected to the corresponding stock area rack member 127 and operating area rack member 131b, and further, operation of the self-propelled motor 145 transfers the punching tool storing magazine 25 from the rightmost turn table 133 to the second operating area 121b. Then, the punch P and the die D can be interchanged by the second punching tool interchanging apparatus 75b.

In the case of transferring the punching tool storing magazine 25 from the first operating area 121a to the stock area 119, transferring the other punching tool storing magazine 25 stocked in the stock area 119 to the first operating area 121a and interchanging the punch P and the die D stored in the other punching tool storing magazine 25 with the punch P and the die D held by the holding portions 13a and 15a of the turrets 5a and 7b, the same operations are performed.

As mentioned above, in accordance with the third embodiment of the present invention, since any one punching tool storing magazine 25 among the plurality of punching tool storing magazines 25 stocked in the stock area 119 can be transferred between the first and second operating areas 121a and 121b, the same effect as that of the first embodiment can be obtained. Further, since the punching tool magazine 25 can be transferred between the first and second operating areas 121a and 121b, the punch P and the die D stored in one punching tool storing magazine 25 can be interchanged with the punch P and the die D held by the turrets 5a and 7b in the first turret punch press 3a and at the same time can be interchanged with the punch P and the die D held by the turrets 5b and 7b in the second turret punch press 3b. Accordingly, the punch P and the die D stored in one punching tool storing magazine 25 can be effectively used and further a multiple kinds of punching processes can be automatically performed in a plurality of turret punch presses.

While preferred embodiments of the present invention have been described using specific terms, such description is for illustrative purposes, and it is to be understood that changes and variations may be made without departing from the spirit or scope of the following claims.

What is claimed is:

1. A punching tool storing and interchanging system storing a multiplicity of punching tools and interchanging a predetermined punching tool among the stored multiple punching tools with a punching tool held by a punching tool holding member in a punch press, comprising:

a plurality of punching tool storing magazines respectively storing the multiplicity of punching tools;

a stock area stocking the plurality of punching tool storing magazines at a position apart from the punching tool holding member;

an operating area positioning the punching tool storing magazine used for interchanging operation among the plurality of punching tool storing magazines near the punching tool holding member;

a magazine transferring apparatus transferring the punching tool storing magazine between the stock area and the operating area; and a punching tool interchanging apparatus interchanging the predetermined punching tool among the multiplicity of punching tools stored in the punching tool storing magazine positioned at the operating area with the punching tool held by the punching tool holding member.

2. The punching tool storing and interchanging system according to claim 1, further comprising:

a plurality of the stock areas positioned in an outer peripheral portion of the operating area;

a stock area guide rail movably supporting the punching tool storing magazine in each of the stock areas to extend to a near portion of the operating area;

a turn table in the operating area rotating around a vertical axis; and an operating area guide rail supporting the punching tool storing magazine in the turn table, wherein the operating area guide rail is connected to a predetermined stock area guide rail among the plurality of stock area guide rails by a rotation of the turn table.

3. The punching tool storing and interchanging system according to claim 2, further comprising:

a stock area rack member in each of the stock areas parallel to the corresponding stock area guide rail; and an operating area rack member in the turn table parallel to the operating area guide rail, wherein the operating area rack member is structured to be connected to a predetermined stock area rack member among the plurality of stock area rack members by the operation of the turn table; and the magazine transferring apparatus comprises a self-propelled motor in each of the punching tool storing magazine and a pinion being capable of meshing with the rack member to be in an interlocking manner connected to an output shaft in each of the self-propelled motor.

4. The punching tool storing and interchanging system according to claim 1, further comprising:

a turn table near the punch press rotating around a vertical axis; and a plurality of magazine supporting portions supporting the punching tool storing magazines with suitable intervals in a peripheral direction on the turn table, wherein the magazine transferring apparatus is a rotating motor for rotating the turn table; and a predetermined magazine supporting portion among the plurality of magazine supporting portions is positioned to the operating area from the stock area by the rotation of the turn table.

5. A punching tool storing and interchanging system storing a multiplicity of punching tools and interchanging a predetermined punching tool among the stored multiple punching tools with a punching tool held by a punching tool holding member in a first, a second, . . . and a number n punch presses, comprising:

a plurality of punching tool storing magazines respectively storing a multiplicity of the punching tools;

a stock area stocking the plurality of punching tool storing magazines at a position apart from the punching tool holding member in the first, the second, . . . and the number n punch press;

a first, a second, . . . and a number n operating areas positioning the punching tool storing magazine used for interchanging operation among the plurality of punching tool storing magazines near each of the punching tool holding members in the first, the second, . . . and the number n punch press;

a magazine transferring apparatus transferring the punching tool storing magazine between the stock area and the first, second, . . . and the number n operating areas and between the plurality of operating areas; and a first, a second, . . . and a number n punching tool interchanging apparatuses interchanging the predetermined punching tool among the multiplicity of punching tools stored in the punching tool storing magazines positioned at the first, the second, . . . and the number n operating areas with the punching tool held by the punching tool holding member in the first, the second, . . . and the number n punch presses.

* * * * *